US012632371B2

(12) United States Patent
Nagaraj et al.

(10) Patent No.: US 12,632,371 B2
(45) Date of Patent: May 19, 2026

(54) METHOD FOR EXTRACTING DATA FROM A DATA MEMORY

(71) Applicant: Robert Bosch GmbH, Stuttgart (DE)

(72) Inventors: Ajay Kumar Nagaraj, Stuttgart (DE); David Huber, Gorxheimertal (DE); Joseph Trotta, Stuttgart (DE); Holger Peters, Ludwigsburg (DE); Daniel Zander, Oberriexingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 63 days.

(21) Appl. No.: 18/644,531

(22) Filed: Apr. 24, 2024

(65) Prior Publication Data

US 2024/0362160 A1     Oct. 31, 2024

(30) Foreign Application Priority Data

Apr. 28, 2023     (DE) ..................... 10 2023 203 999.0

(51) Int. Cl.
G06F 12/00          (2006.01)
G06F 12/02          (2006.01)

(52) U.S. Cl.
CPC ................................. G06F 12/0223 (2013.01)

(58) Field of Classification Search
CPC .... G06F 12/0223; G06F 16/254; G06F 3/061; G06F 3/0608; G06F 3/0655; G06F 3/0683
See application file for complete search history.

(56) References Cited

U.S. PATENT DOCUMENTS

| | | |
|---|---|---|
| 2010/0312757 A1 | 12/2010 | Meschenmoser et al. |
| 2015/0095331 A1* | 4/2015 | He ......................... G06Q 10/06 707/736 |
| 2019/0171368 A1* | 6/2019 | Chen ..................... G06F 3/0613 |
| 2020/0096993 A1 | 3/2020 | Cella et al. |
| 2020/0184374 A1* | 6/2020 | Liu ..................... G06F 16/2246 |
| 2022/0261393 A1* | 8/2022 | Herlocker .............. G06F 17/40 |
| 2022/0358178 A1* | 11/2022 | Wang .................. G06F 16/9532 |

FOREIGN PATENT DOCUMENTS

| | | |
|---|---|---|
| DE | 102018218134 A1 | 5/2019 |
| DE | 102019207212 A1 | 11/2020 |

* cited by examiner

*Primary Examiner* — Shawn X Gu
*Assistant Examiner* — Mohammad S Hasan
(74) *Attorney, Agent, or Firm* — NORTON ROSE FULBRIGHT US LLP

(57) ABSTRACT

A method for extracting data from a data memory. The method includes: providing data; storing the data in a data memory; developing an optimal extraction strategy based on a current use case and/or available resources; extracting data from the data memory based on the optimal extraction strategy; and providing the extracted data.

12 Claims, 2 Drawing Sheets

METHOD FOR EXTRACTING DATA FROM A DATA MEMORY

CROSS REFERENCE

The present application claims the benefit under 35 U.S.C. § 119 of German Patent Application DE 10 2023 203 999.0 filed on Apr. 28, 2023, which is expressly incorporated herein by reference in its entirety.

FIELD

The present invention relates to a method for extracting data from a data memory, with which method resources, for example memory and/or processor capacities, costs and latencies can be reduced when extracting required or desired data from a data memory, in particular a data memory containing large amounts of data.

In this case, the term "data memory" is understood to mean a system that allows the permanent, efficient and consistent storage of large amounts of data, for example a database.

BACKGROUND INFORMATION

Data for controlling a controllable system, in particular a robotic system, for example stations of a multi-stage production process, can be stored in such a data memory. The term "production process" or "manufacturing process" is understood to mean a standardized workflow, i.e., one that meets certain requirements for the manufacture or production of a product, such as a semiconductor module. The production process consists of predefined production methods as well as work and operating resources, so that a saleable product is produced, in particular through mechanical machining and processing. The term "multi-stage production process" is further understood to mean a production process having a plurality of stations, wherein at least one machining or processing step is carried out at each of the individual stations, and wherein the individual stations are controlled one after the other.

Each station has one or more machines or devices for carrying out the corresponding machining or processing steps, wherein the corresponding machines or devices are controlled based on data stored in data memories or assignments between input and/or sensor data and control data in order to obtain the desired output data.

However, the disadvantage here is that data for controlling a plurality of stations or even data for controlling a plurality of controllable systems are often stored in a common data memory, wherein new data can also be added or already contained data can be updated continuously, and wherein extracting required or desired data from such a data memory containing large amounts of data is usually inefficient, in particular with regard to the resources and/or costs required.

A method for updating a database is described in U.S. Patent Application Publication No. US 2010/0312757 A1, wherein the database is divided into individual segments, the segments are divided into segments to be updated explicitly and implicitly, and wherein a segment to be updated implicitly is updated together with a segment to be updated explicitly.

An object of the present invention is therefore to specify an improved method for extracting data from a data memory.

The object may be achieved by a method for extracting data from a data memory according to features of the present invention.

The object may also be achieved by a system for extracting data from a data memory according to features of the present invention.

SUMMARY

According to one example embodiment of the present invention, this object may be achieved by a method for extracting data from a data memory, wherein data are provided, the data are stored in a data memory, an optimal extraction strategy is developed based on a current use case and/or available resources, data are extracted from the data memory based on the optimal extraction strategy, and wherein the extracted data are provided.

In this case, the term "extraction strategy" is understood to be a plan for extracting the data, i.e., specifications for the extraction process. The fact that an optimal extraction strategy is developed based on a current use case and/or available resources means that an extraction strategy is developed that is optimal with respect to the corresponding use case, for example a controllable system to be controlled, and/or with respect to available resources, for example currently available memory and/or processor capacities.

Based on the optimal extraction strategy, the extraction can be optimally adapted to the relevant use case and/or currently available resources, or these can be taken into account when extracting the data.

Overall, an improved method for extracting data from a data memory is thus provided.

According to an example embodiment of the present invention, the step of developing an optimal extraction strategy can comprise integrating filtering operations and/or standardization operations into the extraction strategy.

The term "filtering operations" is understood to mean operations that can weaken or suppress the influence of unwanted data, for example by filtering out unnecessary or unwanted data.

The term "standardization operations" is further understood to mean operations to standardize data, for example to standardize data names and/or to convert data to a standardized form.

The fact that these operations are integrated into the extraction strategy means that the extraction comprises corresponding operations or that these are carried out during the extraction.

For example, recorded or provided data are often stored in the data memory unprocessed, i.e., as recorded, so that the data is not sorted and, for example, individual data may be received or occur twice. By integrating corresponding filtering and/or standardization operations into the extraction process, it can be ensured that only the required or desired data is extracted, so that resources and costs can be saved when extracting the required or desired data. In addition, latencies can also be reduced when subsequently controlling a corresponding controllable system.

In addition, according to an example embodiment of the present invention, the step of developing an optimal extraction strategy can comprise developing the optimal extraction strategy based on known strategy patterns.

The term "strategy pattern" is understood to mean a template or pattern for the extraction process, i.e., corresponding specifications. The term "known strategy patterns"

is understood to mean patterns or specifications for extraction or the extraction process that have already been developed or used in the past.

This allows the extraction process to be flexibly and optimally adapted to the relevant use case based on known patterns, so that in turn resources and costs can be saved when extracting the required or desired data. In addition, latencies can also be reduced when subsequently controlling a corresponding controllable system.

Furthermore, according to an example embodiment of the present invention, the step of developing an optimal extraction strategy can also comprise developing an optimal extraction strategy composed of a plurality of temporal portions.

An "extraction strategy composed of temporal portions" is understood to mean a set of specifications for the extraction process or parts of the extraction process that follow one another in immediate temporal succession. In particular, parts of the extraction strategy relating to different time periods of the extraction process can be developed independently of each other.

This has the advantage that if errors occur or are detected, the entire extraction process does not have to be repeated, but only the portions of the extraction process actually affected during which the corresponding error occurred, as well as any subsequent portions. This in turn can save resources and costs.

In addition, latencies can also be reduced when subsequently controlling a corresponding controllable system.

In one example embodiment of the present invention, the method further comprises recording a time at which the data are extracted and storing the recorded time. The advantage of recording and storing the time at which the data are extracted is that, based on this time, it is possible to trace which data have changed since the last extraction process, e.g. have been updated or newly recorded, so that only these changed data need to be extracted, for example, in a subsequent extraction process. This in turn can save resources and costs. In addition, latencies can also be reduced when subsequently controlling a corresponding controllable system.

The data provided can also comprise sensor data.

A sensor, which is also referred to as a detector, (measured variable or measuring) pickup or (measuring) probe, is a technical component which can detect certain physical or chemical properties and/or the material nature of its surroundings qualitatively or quantitatively as a measured variable.

Thus, circumstances outside the actual data processing system on which the method is carried out can be detected in a simple manner and can be taken into account.

In a further example embodiment of the present invention, a method for controlling a controllable system based on data stored in a data memory is also provided, wherein the method comprises extracting data for controlling the controllable system from the data memory by means of an above-described method for extracting data from a data memory, and controlling the controllable system based on the extracted data.

In this case, the term "controllable system" is understood to mean, in particular, a robotic system, for example a station of a production process.

Thus, according to an example embodiment of the present invention, a method for controlling a controllable system is provided which is based on an improved method for extracting data from a data memory extracted data. Based on the optimal extraction strategy, the extraction can in particular be optimally adapted to the relevant use case and/or currently available resources, or these can be taken into account when extracting the data.

In a further example embodiment of the present invention, a system for extracting data from a data memory is further disclosed, wherein the system comprises a first provision unit designed to provide data, a memory control unit designed to store the provided data in a data memory, a development unit designed to develop an optimal extraction strategy based on a current use case and/or available resources, an extraction unit designed to extract data from the data memory based on the optimal extraction strategy, and a second provision unit designed to provide the extracted data.

An improved system for extracting data from a data memory is thus provided. Based on the optimal extraction strategy, the extraction can in particular be optimally adapted to the relevant use case and/or currently available resources, or these can be taken into account when extracting the data.

According to an example embodiment of the present invention, the development unit can be designed to integrate filtering operations and/or standardization operations into the extraction strategy. For example, recorded or provided data are often stored in the data memory unprocessed, i.e., as recorded, so that the data is not sorted and, for example, individual data may be received or occur twice. By integrating corresponding filtering and/or standardization operations into the extraction process, it can be ensured that only the required or desired data is extracted, so that resources and costs can be saved when extracting the required or desired data. In addition, latencies can also be reduced when subsequently controlling a corresponding controllable system.

In addition, according to an example embodiment of the present invention, the development unit can be designed to develop the optimal extraction strategy based on known strategy patterns. This allows the extraction process to be flexibly and optimally adapted to the relevant use case based on known patterns, so that in turn resources and costs can be saved when extracting the required or desired data. In addition, latencies can also be reduced when subsequently controlling a corresponding controllable system.

Furthermore, according to an example embodiment of the present invention, the development unit can also be designed to develop an optimal extraction strategy composed of a plurality of temporal portions. This has the advantage that if errors occur or are detected, the entire extraction process does not have to be repeated, but only the portions of the extraction process actually affected during which the corresponding error occurred, as well as any subsequent portions. This in turn can save resources and costs. In addition, latencies can also be reduced when subsequently controlling a corresponding controllable system.

In one example embodiment of the present invention, the system further comprises a recording unit designed to record a time at which the data are extracted, and a memory unit for storing the recorded time. The advantage of recording and storing the time at which the data are extracted is that, based on this time, it is possible to trace which data have changed since the last extraction process, e.g. have been updated or newly recorded, so that, for example, only these changed data need to be extracted in a subsequent extraction process. This in turn can save resources and costs. In addition, latencies can also be reduced when subsequently controlling a corresponding controllable system.

The data provided can in turn also comprise sensor data. Thus, circumstances outside the actual data processing system on which the method is carried out can be detected in a simple manner and can be taken into account.

In summary, the present invention provides a method for extracting data from a data memory, with which method resources, for example memory and/or processor capacities, costs and latencies can be reduced when extracting required or desired data from a data memory, in particular a data memory containing large amounts of data.

The described embodiments and developments of the present invention can be combined with one another as desired.

Further possible embodiments, developments and implementations of the present invention also include combinations not explicitly mentioned of features of the present invention described above or in the following relating to the exemplary embodiments.

BRIEF DESCRIPTION OF THE DRAWINGS

The figures are intended to impart further understanding of embodiments of the present invention. They illustrate embodiments and, in connection with the description, serve to explain principles and concepts of the present invention. Other embodiments and many of the mentioned advantages are apparent from the figures. The illustrated elements of the figures are not necessarily shown to scale relative to one another.

DETAILED DESCRIPTION OF EXAMPLE EMBODIMENTS

In the figures, identical reference signs denote identical or functionally identical elements, parts or components, unless stated otherwise.

Figure 1:
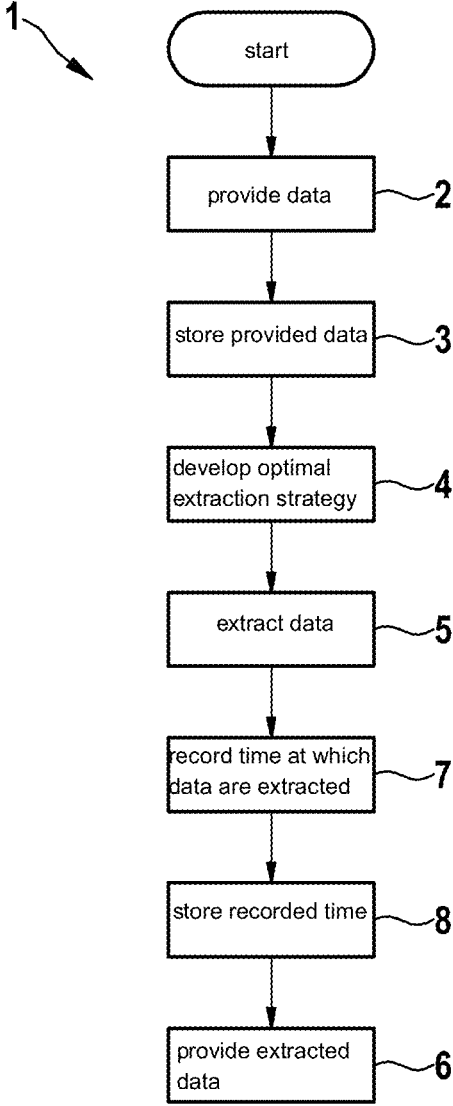
FIG. 1 shows a flowchart of a method for extracting data from a data memory according to embodiments of the present invention.

FIG. 1 shows a flowchart of a method 1 for extracting data from a data memory according to embodiments of the present invention.

In this case, the term "data memory" is understood to mean a system that allows the permanent, efficient and consistent storage of large amounts of data, for example a database.

Data for controlling a controllable system, in particular a robotic system, for example stations of a multi-stage production process, can be stored in such a data memory. The term "production process" or "manufacturing process" is understood to mean a standardized workflow, i.e., one that meets certain requirements for the manufacture or production of a product, such as a semiconductor module. The production process consists of predefined production methods as well as work and operating resources, so that a saleable product is produced, in particular through mechanical machining and processing. The term "multi-stage production process" is further understood to mean a production process having a plurality of stations, wherein at least one machining or processing step is carried out at each of the individual stations, and wherein the individual stations are controlled one after the other.

Each station has one or more machines or devices for carrying out the corresponding machining or processing steps, wherein the corresponding machines or devices are controlled based on data stored in data memories or assignments between input and/or sensor data and control data in order to obtain the desired output data.

However, the disadvantage here is that data for controlling a plurality of stations or even data for controlling a plurality of controllable systems are often stored in a common data memory, wherein new data can be added or already contained data can be updated continuously, and wherein extracting required or desired data from such a data memory containing large amounts of data is usually inefficient, in particular with regard to the resources and/or costs required.

FIG. 1 shows a method 1 that has a step 2 of providing data, a step 3 of storing the provided data in a data memory, a step 4 of developing an optimal extraction strategy based on a current use case and/or currently available resources, a step 5 of extracting data from the data memory based on the optimal extraction strategy and a step 6 of providing the extracted data.

Based on the optimal extraction strategy, the extraction can be optimally adapted to the relevant use case and/or currently available resources, or these can be taken into account when extracting the data.

Overall, an improved method 1 for extracting data from a data memory is thus provided.

In particular, a method 1 is specified with which the extraction of data from a data memory can be flexibly and dynamically adapted to the corresponding circumstances.

The step 6 of providing the data can further comprise storing the data in a further, different memory unit for further processing and/or analysis of the extracted data.

The data memory can also be, for example, a classic database, a data warehouse, a data lake or a distributed file system.

The data can also be in the form of a table or in tabular form.

According to the embodiments of FIG. 1, the step 4 of developing an optimal extraction strategy comprises integrating filtering operations and/or standardization operations into the extraction strategy.

In particular, filtering operations and/or standardization operations are integrated or implemented in the extraction process.

The standardization operations can, for example, comprise standardizing names and/or file formats, or converting the data to a standard or common format.

According to the embodiments of FIG. 1, the step 4 of developing an optimal extraction strategy further comprises developing the optimal extraction strategy based on known strategy patterns.

For example, a plurality of known extraction strategies or known parts of extraction strategies can be stored, wherein an extraction strategy or parts of an extraction strategy that is/are optimal with respect to a current use case can be flexibly selected based on information about the corresponding use case, i.e., further processing of the information relating to the extracted data, or these described circumstances, without the need to redevelop said extraction strategy or parts of an extraction strategy.

In this case, the individual stored extraction strategies or the stored parts can each contain all the information needed to carry out the corresponding extraction process.

In addition, a separate stored part of an extraction strategy can be selected separately for each processing step, for example reading data, transferring data or writing data, wherein the selected parts can then be combined or linked to form a common strategy.

According to the embodiments of FIG. 1, the step 4 of developing an optimal extraction strategy also comprises developing an optimal extraction strategy composed of a plurality of temporal portions.

In particular, the extraction process can be divided into temporal portions or phases, especially portions that each have or fulfill a different purpose.

Intermediate results can be formed and stored for each portion. This has the advantage that if errors occur or are detected, the entire extraction process does not have to be repeated, but only the portions of the extraction process actually affected during which the corresponding error occurred, as well as any subsequent portions. In this way, it can be avoided that the complete extraction process takes up to several days in some cases.

As FIG. 1 shows, the method 1 also has a step 7 of recording a time at which the data are extracted and a step 8 of storing the recorded time.

The recorded time can then be compared, for example, with the times at which the data contained in the data memory were updated, wherein a decision can be made based on the comparison results as to which data actually still need to be extracted or read out.

The data also contains sensor data, in particular sensor data representing or characterizing the corresponding use case.

Overall, FIG. 1 thus shows a method 1 with which data can be flexibly extracted from a data memory in a specific way.

The extracted data can then be used to control a corresponding controllable system, for example to manufacture semiconductor modules. The extracted data can also form the input data for a machine learning algorithm.

Figure 2:
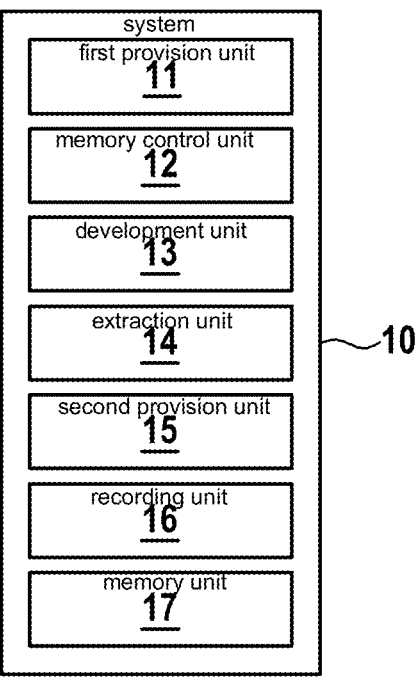
FIG. 2 shows a schematic block diagram of a system for extracting data from a data memory according to embodiments of the present invention.

FIG. 2 shows a schematic block diagram of a system 10 for extracting data from a data memory according to embodiments of the present invention.

As FIG. 2 shows, the system 10 has a first provision unit 11 designed to provide data, a memory control unit 12 designed to store the provided data in a data memory, a development unit 13 designed to develop an optimal extraction strategy based on a current use case and/or available resources, an extraction unit 14 designed to extract data from the data memory based on the optimal extraction strategy, and a second provision unit 15 designed to provide the extracted data.

The first provision unit can in particular be a receiver which is designed to receive corresponding data, for example sensor data. The second provision unit can in particular be a transmitter designed to transmit corresponding data.

Furthermore, the first provision unit and the second provision unit can also be integrated into a common transceiver.

The memory control unit, the development unit and the extraction unit can also, for example, in each case be implemented on the basis of a code that is stored in a memory and can be executed by a processor.

The development unit 13 is designed to integrate filtering operations and/or standardization operations into the extraction strategy.

In addition, the development unit 13 is also designed to develop the optimal extraction strategy based on known strategy patterns.

Furthermore, the development unit 13 is also designed to develop an optimal extraction strategy composed of a plurality of temporal portions.

As FIG. 2 shows, the system 10 also has a recording unit 16 designed to record a time at which the data are extracted, and a memory unit 17 for storing the recorded time.

The recording unit can, for example, be implemented on the basis of code that is stored in a memory and can be executed by a processor.

The memory unit can also be designed independently of the data memory. Furthermore, the memory unit can also be integrated into the data memory.

In turn, the data provided further comprises sensor data.

The system 10 shown is also designed to carry out an above-described method for extracting data from a data memory.

What is claimed is:

1. A method for extracting data from a data memory, the method comprising the following steps:
  providing data;
  storing the provided data in a data memory;
  developing an optimal extraction strategy based on a current use case and/or available resources, to flexibly and dynamically adapt extraction of the data from the data memory to corresponding circumstances, wherein the use case is a controllable system to be controlled based on the extracted data and the available resources are currently available memory and/or processor capacities;
  extracting the data from the data memory based on the optimal extraction strategy; and
  providing the extracted data,
  wherein the step of developing the optimal extraction strategy includes developing the optimal extraction strategy as a plurality of temporal portions.

2. The method according to claim 1, wherein the step of developing the optimal extraction strategy includes integrating filtering operations and/or standardization operations into the extraction strategy.

3. The method according to claim 1, wherein the step of developing the optimal extraction strategy includes developing the optimal extraction strategy based on known strategy patterns.

4. The method according to claim 1, further comprising the following steps:
  recording a time at which the data are extracted; and
  storing the recorded time.

5. The method according to claim 1, wherein the provided data includes sensor data.

6. A method for controlling a controllable system based on data stored in a data memory, the method comprising the following steps:
  extracting data for controlling the controllable system from the data memory by a method of extracting data from a data memory, the method of extracting data including:
    providing the data,
    storing the provided data in a data memory,
    developing an optimal extraction strategy based on a current use case and/or available resources, to flexibly and dynamically adapt extraction of the data from the data memory to corresponding circumstances, wherein the use case is a controllable system to be controlled based on the extracted data and the available resources are currently available memory and/or processor capacities, extracting the data from the data memory based on the optimal extraction strategy, and providing the extracted data, wherein the step of developing the optimal extraction strategy includes developing the optimal extraction strategy as a plurality of temporal portions; and controlling the controllable system based on the extracted data.

7. A system for extracting data from a data memory, comprising:

a first provision unit configured to provide data;

a memory control unit configured to store the provided data in the data memory;

a development unit configured to develop an optimal extraction strategy based on a current use case and/or available resources, to flexibly and dynamically adapt extraction of the data from the data memory to corresponding circumstances, wherein the use case is a controllable system to be controlled based on the extracted data and the available resources are currently available memory and/or processor capacities;

an extraction unit configured to extract data from the data memory based on the optimal extraction strategy; and a second provision unit configured to provide the extracted data, wherein the development unit is configured to develop the optimal extraction strategy as a plurality of temporal portions.

8. The system according to claim 7, wherein the development unit is configured to integrate filtering operations and/or standardization operations into the extraction strategy.

9. The system according to claim 7, wherein the development unit is configured to develop the optimal extraction strategy based on known strategy patterns.

10. The system according to claim 7, wherein the system further comprises a recording unit configured to record a time at which the data are extracted, and a memory unit configured to store the recorded time.

11. The system according to claim 7, wherein the provided data include sensor data.

12. The system according to claim 7, further comprising:

a control unit configured to control a controllable system based the extracted data.

* * * * *